United States Patent [19]

Stenger

[11] Patent Number: 5,217,128
[45] Date of Patent: Jun. 8, 1993

[54] THERMOPLASTIC BOTTLE WITH REINFORCING RIBS

[75] Inventor: Donald R. Stenger, Rockford, Ill.

[73] Assignee: Johnson Enterprises, Inc., Rockford, Ill.

[21] Appl. No.: 783,134

[22] Filed: Oct. 28, 1991

[51] Int. Cl.$^5$ ............................ B65D 1/02; B65D 1/42
[52] U.S. Cl. ...................... 215/1 C; 220/669; 220/671
[58] Field of Search ............... D9/556, 557; 215/1 C, 215/31; 220/608, 671, 669

[56] References Cited

U.S. PATENT DOCUMENTS

| | | | |
|---|---|---|---|
| D. 62,888 | 8/1923 | Davis, Jr. et al. | D9/556 X |
| D. 200,603 | 3/1965 | Petitto | D9/556 X |
| D. 211,509 | 6/1968 | Vanderhyde | D9/556 X |
| D. 262,521 | 6/1982 | Frahm et al. | D9/556 X |
| D. 295,499 | 5/1988 | Le Fevre | D9/556 |
| 3,114,932 | 12/1963 | Donnelly | 215/1 C X |
| 4,024,975 | 5/1977 | Uhlig | 215/1 C |
| 4,170,622 | 10/1979 | Uhlig | 215/1 C X |
| 4,620,639 | 11/1986 | Yoshino | 220/608 X |
| 4,868,026 | 9/1989 | Shimizu et al. | 215/1 C X |
| 5,067,622 | 11/1991 | Garver et al. | 215/1 C |

FOREIGN PATENT DOCUMENTS

| | | | |
|---|---|---|---|
| 989331 | 5/1976 | Canada | 215/31 |
| 136222 | 4/1985 | European Pat. Off. | 215/1 C |
| 324305 | 7/1989 | European Pat. Off. | 215/1 C |
| 856958 | 12/1960 | United Kingdom | 215/1 C |

Primary Examiner—Sue A. Weaver
Attorney, Agent, or Firm—Leydig, Voit & Mayer

[57] ABSTRACT

A relatively large water bottle is blow molded from thermoplastic material and includes a generally cylindrical body, a generally frustoconical top breast at the upper end of the body, and a filling and dispensing neck extending upwardly from the central portion of the top breast. Angularly spaced reinforcing ribs are formed on the inner side of the top breast to increase the column strength thereof. The ribs are formed as an incident to blow molding the bottle from a preform having angularly spaced external ribs on a frustoconical portion of the preform, the external ribs being converted into internal ribs during the blow molding operation.

1 Claim, 4 Drawing Sheets

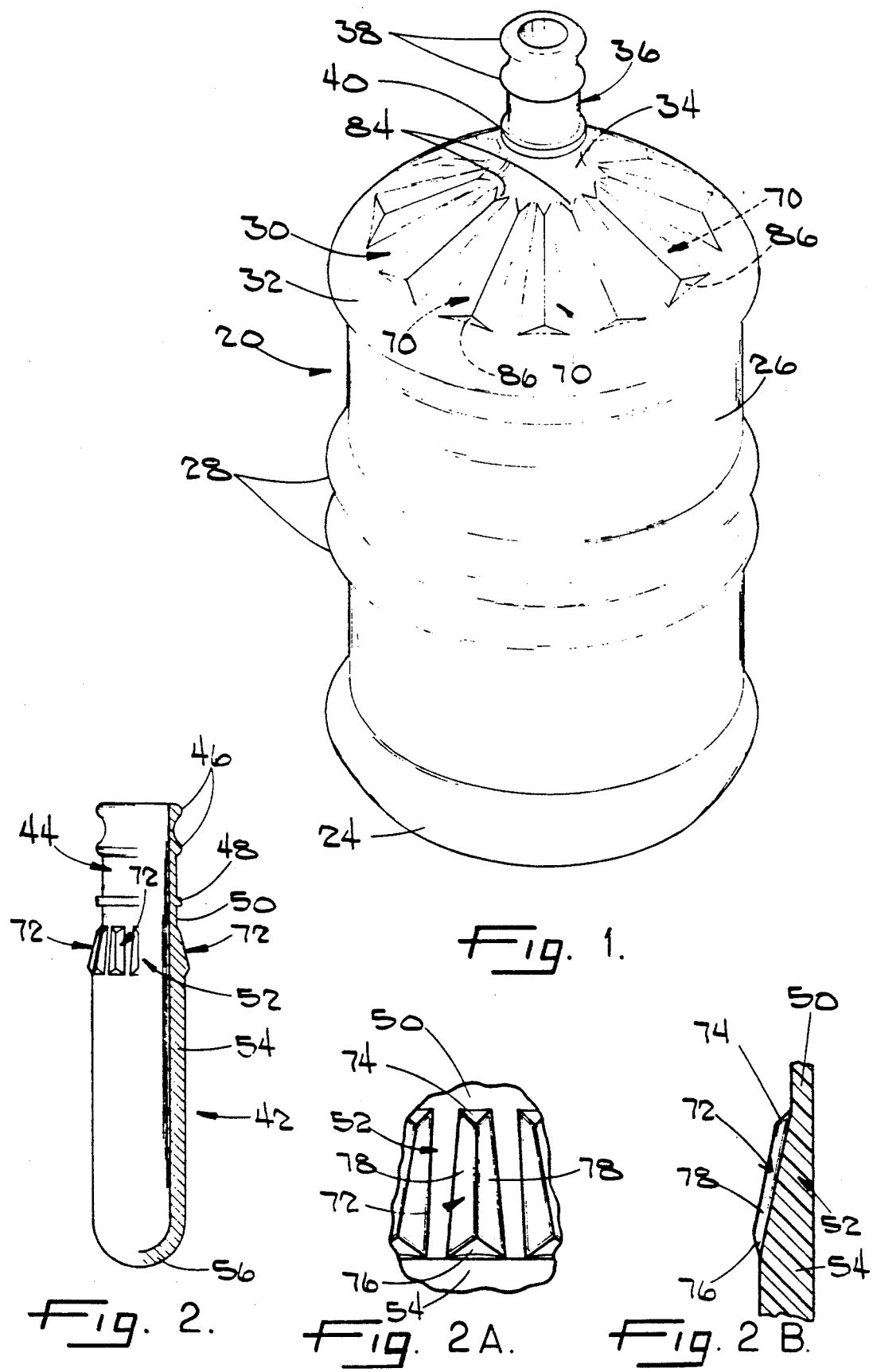

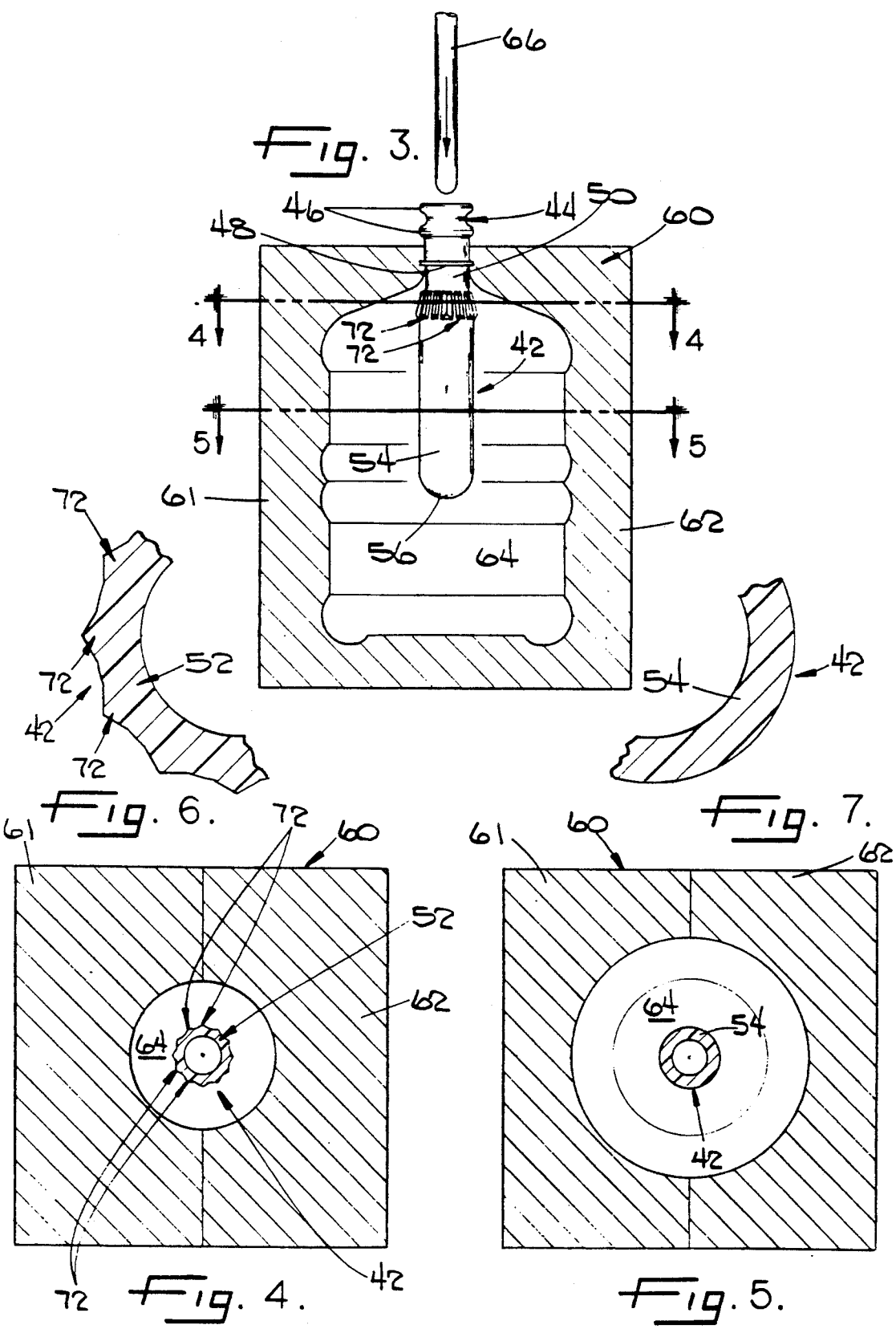

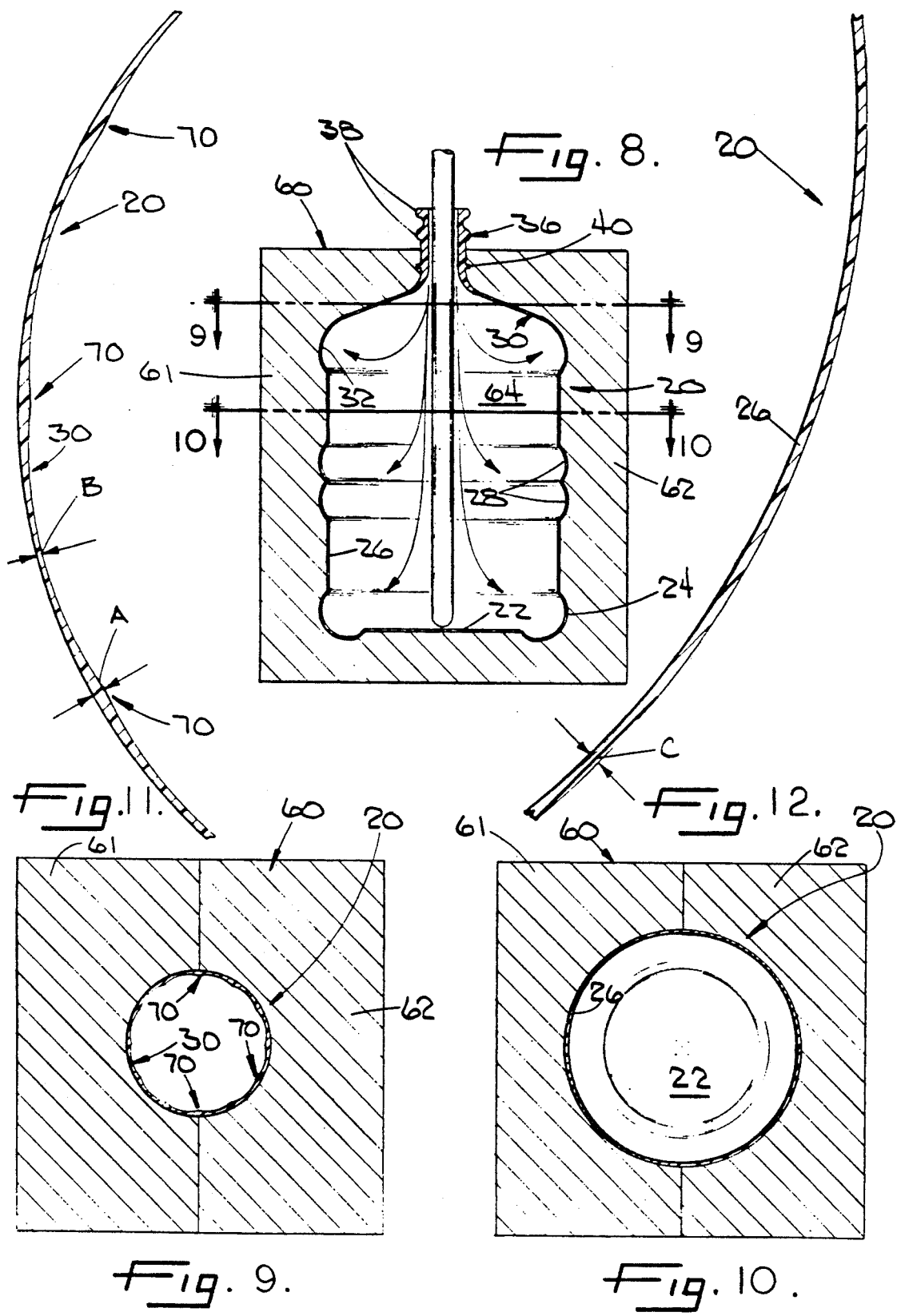

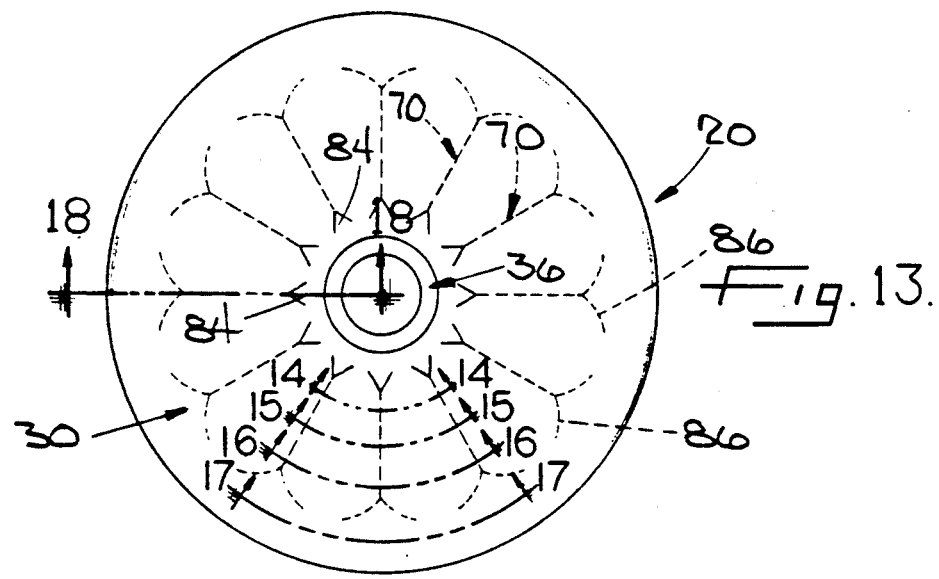
Fig. 13.
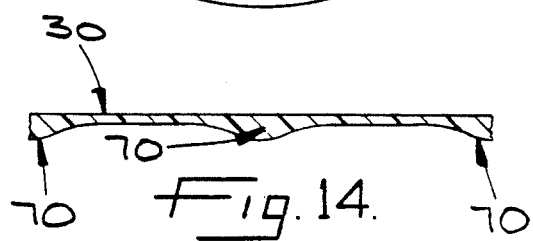
Fig. 14.
Fig. 15.
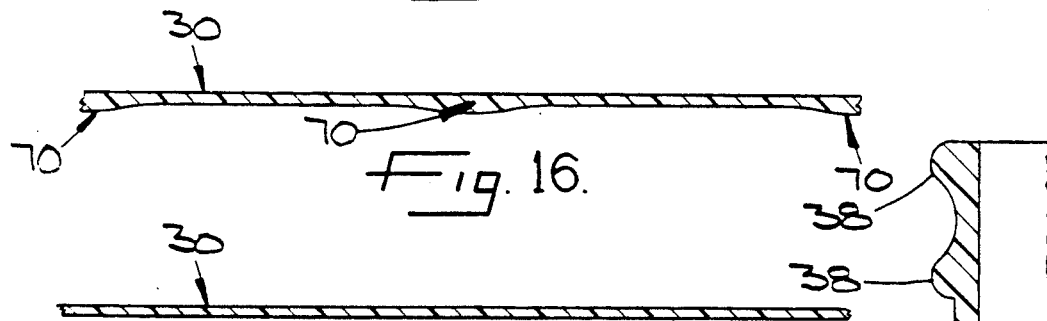
Fig. 16.
Fig. 17.
Fig. 18.

THERMOPLASTIC BOTTLE WITH REINFORCING RIBS

BACKGROUND OF THE INVENTION

This invention relates generally to a container and, more particularly, to a relatively large and generally cylindrical bottle (e.g., a five gallon bottle) for holding purified drinking water or the like. Bottles of this type usually include a generally cylindrical body, a generally frustoconical top breast at the upper end of the body, and a tubular filling and dispensing neck projecting upwardly from the central portion of the breast.

Bottles of the type of the invention usually are inverted and installed on a gravity-type dispenser. In order to enable the bottle to be used with standard filling equipment, the inner diameter of the neck of the body is approximately 1-⅝" and is small in comparison to the inner diameter (e.g., about 10") of the generally cylindrical body of the bottle.

Most water bottles of this type are blow molded from a plastic such as polycarbonate or polyvinylchloride. The molding is effected by extruding hot plastic into a mold and by using pressurized air to blow the plastic into a shape conforming to the mold.

Polyethylene terephthalate (PET) is recognized as a material which is superior in many respects to polycarbonate and polyvinylchloride for use in bottles and the like. PET is stronger than the more conventional materials and thus a more economical and lighter weight bottle may be produced by using PET since less material is required to make a bottle of given size and strength. Also, PET has virtually no effect on the taste of the water or other beverage and may be readily recycled.

Relatively small (e.g., two liter) bottles made of PET are currently being produced in large quantities. Such bottles are made by providing an injection molded PET preform and by blow molding the preform into the shape of the ultimate bottle. Also, the assignee of the present invention has made large (e.g., 20 liter) PET spherical containers for use with draft beer and the like. Such spherical containers—known by the trade designator BEER SPHERE—also are formed by blow molding an injection molded PET preform.

Large (e.g., five gallon) and generally cylindrical water bottles for use with standard filling equipment and standard dispensers have not been previously produced on a commercial basis by blow molding an injection molded PET preform. The difficulty in producing such a bottle resides in part in keeping the diameter of the filling and dispensing neck small in relation to the diameter of the generally cylindrical body while still imparting adequate strength to the container. A particularly vulnerable area of the container is its frustoconical top breast since the breast must support considerable weight when filled bottles are stacked on top of one another during shipment.

SUMMARY OF THE INVENTION

The general aim of the present invention is to provide a new and improved water bottle of the above general type which may be blow molded from an injection molded preform and which is particularly characterized in that its top breast possesses superior column strength.

A more detailed object of the invention is to increase the column strength of the breast of the bottle through the provision of unique ribs which project inwardly from and are spaced angularly around the inner surface of the breast.

Still another object is to form the ribs on the inside of the breast as an incident to blow molding the bottle and without need of using any special tooling in the blow mold to create the ribs.

The invention also resides in the novel shape and location of the ribs.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved bottle incorporating the unique features of the present invention.

FIG. 2 is a partial side elevational view and a partial sectional view of a preform from which the bottle is made.

FIG. 2A is an enlarged face view of one of the ribs of the preform shown in FIG. 2.

FIG. 2B is a cross-section taken substantially along the line 2B—2B of FIG. 2A.

FIG. 3 is a cross-sectional view schematically showing the preform in a blow mold prior to blowing of the bottle.

FIGS. 4 and 5 are cross-sections taken substantially along the lines 4—4 and 5—5, respectively, of FIG. 3.

FIG. 6 is an enlarged view of a portion of the preform shown in FIG. 4.

FIG. 7 is an enlarged view of a portion of the preform shown in FIG. 5.

FIG. 8 is a view similar to FIG. 3 but shows the bottle fully blown in the mold.

FIGS. 9 and 10 are fragmentary cross-sections taken substantially along the lines 9—9 and 10—10, respectively, of FIG. 8.

FIG. 11 is an enlarged view of a portion of the bottle shown in FIG. 9.

FIG. 12 is an enlarged view of a portion of the bottle shown in FIG. 10.

FIG. 13 is a top plan view of the bottle.

FIGS. 14, 15, 16, 17 and 18 are enlarged fragmentary cross-sections taken substantially along the lines 14—14, 15—15, 16—16, 17—17 and 18—18, respectively, of FIG. 13.

DETAILED DESCRIPTION OF THE PREFERRED EMBODIMENT

For purposes of illustration, the invention has been shown in the drawings as incorporated in a water bottle 20 of the type used to hold purified water and typically installed in an inverted position on a gravity-type dispenser (not shown). The present bottle has a capacity of five gallons although it should be appreciated that the principles of the invention are applicable to other sizes of bottles. Also, the present bottle preferably is blow molded from PET but other thermoplastic materials could be used.

As shown most clearly in FIGS. 1 and 8, the bottle 20 is of one-piece construction and is formed with a generally circular bottom wall 22 having an enlarged, bulbous and ring-like peripheral portion 24 which strengthens the bottom while defining an annular foot for the bottom. Extending upwardly from the peripheral portion is a generally cylindrical side wall 26. Two ringlike bulbous portions 28 are located midway along the height of the side wall to increase the hoop and column strength of the side wall.

Located at the upper end of the side wall 26 and extending upwardly and inwardly therefrom is a top breast 30 which is generally frustoconical except for a convexly curved lower portion 32 (FIG. 18) immediately adjacent the upper end of the side wall 26 and except for a concavely curved upper portion 34 at the upper end of the breast. The concavely curved portion merges gradually with a tubular neck 36 which extends upwardly from the center portion of the breast. In the present bottle 20, the neck is formed with two upper rings 38 (FIG. 18) which coact with a removable closure (not shown) and with a lower ring 40 which may be engaged by a hand tool for lifting and carrying the bottle. As is typical of bottles of this kind, the diameter of the neck is small in comparison to the diameter of the side wall 26. For example, the inner diameter of the neck may be only about 1-⅜" while the inner diameter of the side wall may be in the neighborhood of 10".

Advantageously, the bottle 20, even though generally cylindrical and of relatively large capacity, is formed by blow molding an injection molded preform 42 made of PET. The preform is shown most clearly in FIG. 2 and comprises a neck 44 with rings 46 and 48. The neck 44 and the rings 46 and 48 of the preform 42 are not changed during the blow molding operation and they form the neck 36 and the rings 38 and 40, respectively, of the ultimate bottle 20.

A short cylindrical preform section 50 is located immediately below the ring 48 and immediately above a frustoconical section 52 which forms the breast 30 of the ultimate bottle 20. The frustoconical section 52 tapers inwardly as it progresses upwardly.

The preform 42 further includes a cylindrical body section 54 (FIG. 2) located below the frustoconical section 52 and used to form the side wall 26 and the ringlike bulbous portions 28 of the bottle 20. At its lower end, the cylindrical body section 54 merges gradually with a generally hemispherical end section 56 which eventually forms the bottom wall 22 and the annular foot 24 of the bottle. The side section 54 and the end section 56 of the preform have a relatively large wall thickness of approximately ⅛".

To form the bottle 20, the preform 42 is heated and then is positioned in a blow mold 60 as shown in FIG. 3 with the neck 44 held by the two mold halves 61 and 62 and with the remainder of the preform extending downwardly into a cavity 64 having a shape corresponding to the external shape of the bottle. While the preform is in a soft state, pressurized air is injected into the neck 44 at a controlled rate to cause the material of the preform to stretch and expand into engagement with the wall of the cavity and thereby convert the preform into the bottle. As air is injected into the neck 44, a stretch rod 66 is moved downwardly into the preform and engages the bottom section 56 thereof to help center and shape the bottle and to help keep the bottle of substantially uniform wall thickness.

Blow-molding of bottles from injection molded PET preforms is conventional in and of itself. In the present bottle 20, however, the ratio of the diameter of the side wall 26 to the diameter of the neck 36 is relatively high, herein on the order of six to one. As a result of this high aspect ratio, the frustoconical breast 30 is relatively large in area and inherently possesses low column strength.

In accordance with the present invention, the column strength of the frustoconical breast 30 is significantly increased by forming a plurality of angularly spaced ribs 70 on the inner side of the breast. Advantageously, the internal ribs 70 are formed during the blow molding operation and without need of providing any special tooling in the blow mold 60.

More specifically, the foregoing is achieved by forming a plurality of angularly spaced ribs 72 (FIG. 2) on the outer surface of the frustoconical section 52 of the preform 42, there being twelve equally spaced ribs in the present instance. Each rib extends substantially axially along the frustoconical section 52 and includes an upper end 74 (FIG. 2A) located closely adjacent the junction of the frustoconical section 52 with the cylindrical section 50 of the neck 44. Each rib also includes a lower end 76 located closely adjacent the junction of the frustoconical section 52 with the cylindrical body section 54. As each rib 72 proceeds from its upper end 74 toward its lower end 76, it progressively increases in circumferential width and also progressively increases in radial thickness. The two ends 74 and 76 of each rib are disposed in oppositely sloped planes which are inclined at obtuse angles relative to the neck section 50 and the body section 54, respectively. The two ends 74 and 76 are shaped as similar isosceles triangles but the upper triangular end 74 is smaller in size than the lower triangular end 76.

Each rib 72 of the preform 42 is completed by two sides 78 which face in circumferentially opposite directions. Each side 78 is shaped substantially as a trapezium and extends between the upper and lower ends 74 and 76 of the rib. The two sides 78 of each rib join one another along a line which extends generally axially between the outermost apices of the upper and lower ends 74 and 76.

When the softened preform 42 is blown and stretched by the pressurized air injected into the neck 44, the external ribs 72 elongate in length and reduce in thickness as the frustoconical section 52 of the preform starts stretching into the form of the frustoconical breast 30 of the ultimate bottle 20. In addition, the lower end portions of the ribs start diverging or fanning away from the upper end portions of the ribs as the frustoconical section 52 is stretched and is converted into the frustoconical breast 30.

Upon engaging the smooth frustoconical sides of the mold cavity 64, the external ribs 72 of the preform 42 are forced inwardly and form the internal ribs 70 of the ultimate bottle. In other words, with the continued application of internal pressure in the preform and upon engagement of the external ribs 72 with the sides of the cavity 64, the ribs have no place to go but inwardly and thus the thick material which originally formed ribs 72 on the outside of the preform is displaced inwardly and is converted into ribs 70 on the inside surface of the frustoconical breast 30 of the bottle 20.

The cross-sectional configuration of the ribs 70 is best shown in FIGS. 14 to 16. As illustrated, each rib 70 is relatively thick and has a comparatively small angular width along that length of the rib adjacent the upper end portion of the breast 30. As each rib proceeds downwardly and outwardly along the interior of the breast, its thickness progressively decreases while its width progressively increases as illustrated in FIGS. 15 and 16, the decrease in thickness also being shown by FIG. 18. Finally, each rib completely disappears near the extreme lower end portion of the breast as depicted in FIG. 17.

FIGS. 14 to 16 also illustrate how the ribs 70 fan away from one another as the ribs progress downwardly from the upper end portion of the frustoconical breast 30 toward the lower end thereof. As shown in FIG. 14, the angular spacing between the ribs is relatively small near the upper end portion of the breast but, as the ribs proceed downwardly, the angular spacing progressively increases as illustrated in FIGS. 15 and 16.

The thickness and angular spacing of the ribs 70 also are illustrated in FIG. 11. As shown, each rib is of maximum thickness at the area indicated at A and then gradually decreases to a minimum thickness B upon progressing angularly in opposite directions from A. This is in contrast to the cylindrical side wall 26 which is of substantially uniform thickness C (FIG. 12) around its circumference.

In some cases, the extreme upper ends 74 of the preform ribs 72 may retain their original form after the preform 42 has been converted into the bottle 20. This results in generally triangular protrusions 84 (FIGS. 1 and 13) being left on the outside of the breast 30 in the area of the concavely curved portion 34. Also, the extreme lower ends 76 of the preform ribs become greatly stretched during the blow molding operation and cause angularly spaced triangular impressions 86 to be left on the inner side of the breast adjacent the convexly curved portion 32.

With the foregoing arrangement, the fan-shaped array of ribs 70 on the inside of the frustoconical breast 30 significantly increases the column strength of the breast and reduces flexing and collapsing of the breast when bottles are stacked on top of one another. The ribs are virtually undetectable to feel on the outside of the breast and create a distinctive sunburst appearance through the transparent top of the breast.

I claim:

1. A one-piece blow molded container made of thermoplastic material, said container having a generally circular bottom wall, having a generally cylindrical side wall extending upwardly from the outer periphery of said bottom wall, having a generally frustoconical breast extending upwardly and inwardly from the outer periphery of said side wall, and having a tubular neck extending upwardly from the central portion of said breast; said bottom wall, said side wall, said breast and said neck all having inner and outer surfaces; and a plurality of angularly spaced ribs projecting inwardly from the inner surface of said breast to impart column strength to said breast, each of said ribs including an upper end located adjacent the lower end portion of said neck and further including a lower end located adjacent the upper end of said side wall, said ribs diverging away from one another as said ribs proceed downwardly and outwardly from said neck, each of said ribs progressively decreasing in thickness and progressively increasing in angular width over a substantial portion of the length of the rib as the rib progresses downwardly and outwardly from said neck and along said breast.

* * * * *